US008708798B2

(12) United States Patent
Canterbury et al.

(10) Patent No.: US 8,708,798 B2

(45) Date of Patent: Apr. 29, 2014

(54) WAGERING GAME MACHINE CABINET MEMORY

(75) Inventors: Stephen A. Canterbury, Antioch, IL (US); Victor Mercado, Berwyn, IL (US); Charles R. Bleich, Cary, IL (US); Timothy C. Loose, Chicago, IL (US); Jorge Luis Shimabukuro, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 450 days.

(21) Appl. No.: 12/941,642

(22) Filed: Nov. 8, 2010

(65) Prior Publication Data

US 2012/0115564 A1 May 10, 2012

(51) Int. Cl.
*A63F 9/24* (2006.01)
*G06F 17/00* (2006.01)

(52) U.S. Cl.
USPC ............................................. 463/20; 463/46

(58) Field of Classification Search
None
See application file for complete search history.

(56) References Cited

U.S. PATENT DOCUMENTS

| | | | | |
|---|---|---|---|---|
| 6,135,887 | A * | 10/2000 | Pease et al. | 463/42 |
| 6,488,585 | B1 * | 12/2002 | Wells et al. | 463/43 |
| RE39,666 | E * | 5/2007 | Walsh et al. | 463/25 |
| 7,320,642 | B2 | 1/2008 | Gentles et al. | |
| 7,798,900 | B2 * | 9/2010 | Nguyen et al. | 463/29 |
| 7,988,559 | B2 * | 8/2011 | Yoseloff et al. | 463/42 |
| 7,996,916 | B2 * | 8/2011 | Cockerille et al. | 726/30 |
| 2001/0036866 | A1 * | 11/2001 | Stockdale et al. | 463/42 |
| 2003/0195033 | A1 * | 10/2003 | Gazdic et al. | 463/20 |
| 2005/0197191 | A1 * | 9/2005 | McKinley et al. | 463/43 |
| 2005/0215325 | A1 * | 9/2005 | Nguyen et al. | 463/46 |
| 2005/0227771 | A1 * | 10/2005 | Nelson et al. | 463/43 |
| 2006/0183544 | A1 * | 8/2006 | Okada | 463/31 |
| 2006/0205515 | A1 * | 9/2006 | Cockerille et al. | 463/43 |
| 2006/0247050 | A1 * | 11/2006 | Mathis | 463/39 |
| 2006/0287072 | A1 * | 12/2006 | Walker et al. | 463/25 |
| 2006/0287098 | A1 * | 12/2006 | Morrow et al. | 463/42 |
| 2007/0197301 | A1 * | 8/2007 | Cole | 463/46 |
| 2008/0058059 | A1 * | 3/2008 | Fitzsimons et al. | 463/20 |
| 2008/0058097 | A1 * | 3/2008 | Martinek et al. | 463/25 |
| 2008/0076547 | A1 * | 3/2008 | Bigelow et al. | 463/29 |
| 2008/0102919 | A1 * | 5/2008 | Rowe et al. | 463/18 |
| 2008/0268934 | A1 * | 10/2008 | Mattice et al. | 463/16 |
| 2009/0017896 | A1 * | 1/2009 | Page | 463/20 |
| 2009/0082083 | A1 * | 3/2009 | Wilson et al. | 463/20 |
| 2009/0149245 | A1 * | 6/2009 | Fabbri | 463/25 |
| 2009/0275401 | A1 * | 11/2009 | Allen et al. | 463/29 |
| 2010/0113163 | A1 * | 5/2010 | Yang | 463/43 |
| 2012/0040751 | A1 * | 2/2012 | Peters | 463/29 |

FOREIGN PATENT DOCUMENTS

WO WO-2008045454 A2 4/2008

* cited by examiner

*Primary Examiner* — Paul A D'Agostino
(74) *Attorney, Agent, or Firm* — Nixon Peabody LLP

(57) ABSTRACT

Systems described herein include wagering game machines having a cabinet memory mounted or affixed to a cabinet or cabinet component. The cabinet memory provides configuration data and manufacturing data for the cabinet and cabinet components. The configuration data may be used during operation of the wagering game machine to properly configure the components and operation of the wagering game machine.

22 Claims, 10 Drawing Sheets

SWITCH MAP 402 404 312

| SW # | LABEL |
| --- | --- |
| 1 | MAIN DOOR |
| 2 | REAR DOOR |
| 3 | CASH DOOR |
| 4 | TOP BOX DOOR |
| ... | ... |
| N | LOGIC COMPARTMENT DOOR |

FIG. 4

WAGERING GAME MACHINE CABINET MEMORY

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game machines, and more particularly to wagering game machines with a cabinet configuration memory.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content and wagering game machines with new game themes, game settings, bonus events, game software, and other electronic data.

In addition, the cabinets and components within a wagering game machine may vary in order to support the various themes, games, and configurations for the gaming machine. The various combinations of cabinets and components within cabinets can make it difficult for software executing on the wagering game machine to determine and account for the hardware environment (cabinet, reels, lights, audio etc.) in which the software is running. Previous systems have used DIP (dual in-line package) switch settings to identify which of a limited number of configurations apply to a wagering game machine. However the number of such configurations is limited by the number of switch settings available.

Further, it can be difficult for a technician to properly configure a wagering game machine when variations in the types of components are present. For example, a wagering game machine may have one of a variety of different audio amplifiers, all which may look the same or very similar to one another, and each requiring a different configuration in order to work properly. It can be difficult for a technician configuring the wagering game machine to discern which of the different audio amplifiers are present in the machine, leading to the potential for erroneous configuration of the device.

BRIEF DESCRIPTION OF THE FIGURES

Embodiments of the invention are illustrated by way of example and not limitation in the Figures of the accompanying drawings in which:

FIG. 4 is an example component map illustrating a mapping of switches to labels.

DESCRIPTION OF THE EMBODIMENTS

The following detailed description refers to the accompanying drawings that depict various details of examples selected to show how the present invention may be practiced. The discussion addresses various examples of the inventive subject matter at least partially in reference to these drawings, and describes the depicted embodiments in sufficient detail to enable those skilled in the art to practice the invention. Many other embodiments may be utilized for practicing the inventive subject matter other than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" are not intended necessarily to refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

Example Wagering Game Machine

Figure 1:
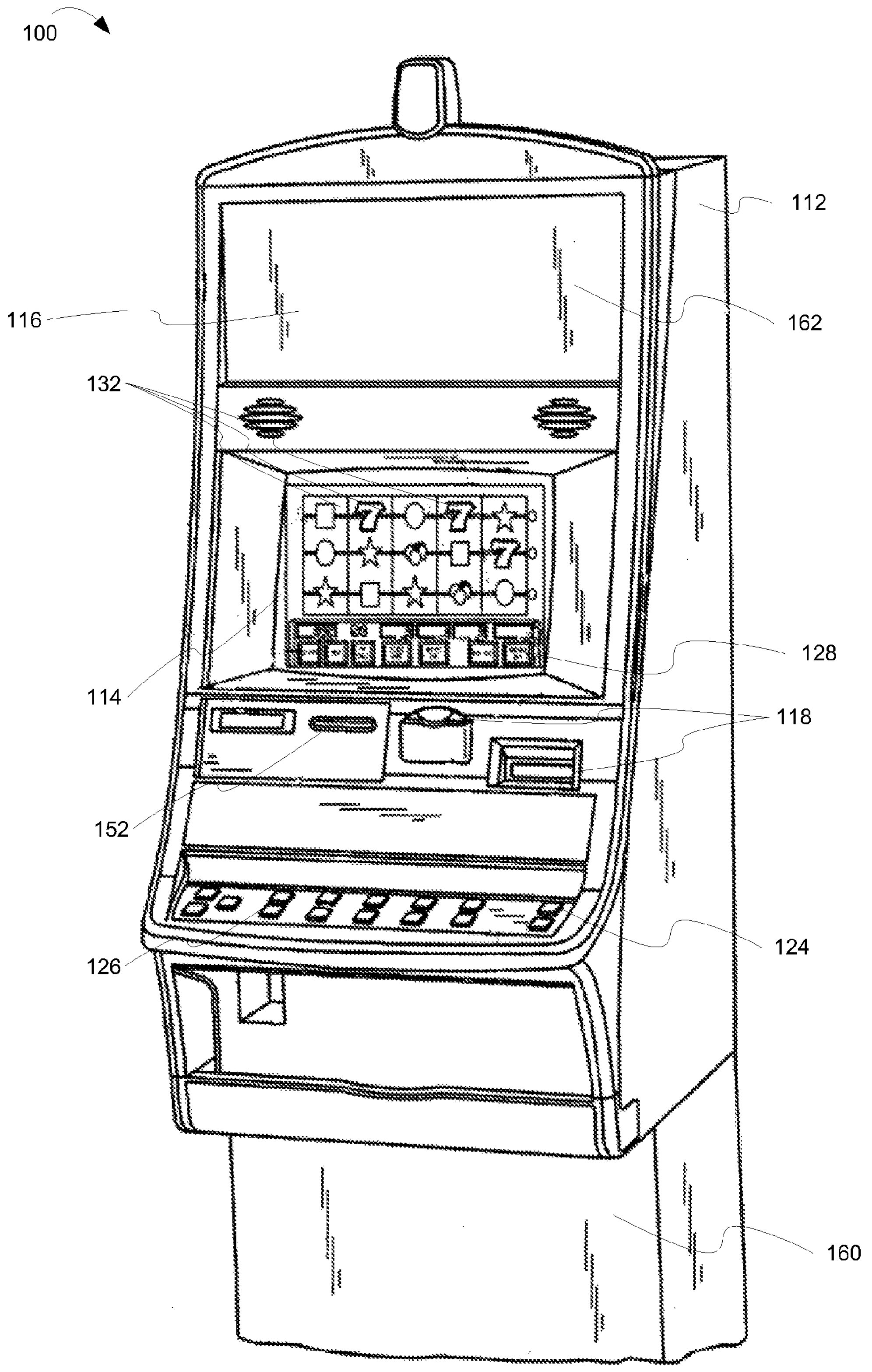
FIG. 1 is a perspective view of an example wagering game machine, in which embodiments of the invention operate.

FIG. 1 is a perspective view of a wagering game machine, according to example embodiments of the invention. Referring to FIG. 1, a wagering game machine 100 is used in gaming establishments, such as casinos. According to embodiments, the wagering game machine 100 can be any type of wagering game machine and can have varying structures and methods of operation. For example, the wagering game machine 100 can be an electromechanical wagering game machine configured to play mechanical slots, or it can be an electronic wagering game machine configured to play video casino games, such as blackjack, slots, keno, poker, blackjack, roulette, etc.

The wagering game machine 100 comprises a cabinet 112 (also referred to as a housing) and includes input devices, including value input devices 118 and a player input device 124. For output, the wagering game machine 100 includes a primary display 114 for displaying information about a basic wagering game. The primary display 114 can also display information about a bonus wagering game and a progressive wagering game. The wagering game machine 100 also includes a secondary display 116 for displaying wagering game events, wagering game outcomes, and/or signage information. While some components of the wagering game machine 100 are described herein, numerous other elements can exist and can be used in any number or combination to create varying forms of the wagering game machine 100.

The value input devices 118 can take any suitable form and can be located on the front of the cabinet 112. The value input devices 118 can receive currency and/or credits inserted by a player. The value input devices 118 can include coin acceptors for receiving coin currency and bill acceptors for receiving paper currency. Furthermore, the value input devices 118 can include ticket readers or barcode scanners for reading information stored on vouchers, cards, or other tangible portable storage devices. The vouchers or cards can authorize access to central accounts, which can transfer money to the wagering game machine 100.

The player input device 124 comprises a plurality of push buttons on a button panel 126 for operating the wagering game machine 100. In addition, or alternatively, the player input device 124 can comprise a touch screen 128 mounted over the primary display 114 and/or secondary display 116.

The various components of the wagering game machine 100 can be connected directly to, or contained within, the cabinet 112. Alternatively, some of the wagering game machine's components can be located outside of the cabinet 112, while being communicatively coupled with the wagering game machine 100 using any suitable wired or wireless communication technology.

The operation of the basic wagering game can be displayed to the player on the primary display 114. The primary display 114 can also display a bonus game associated with the basic wagering game. The primary display 114 can include a cathode ray tube (CRT), a high resolution liquid crystal display (LCD), a plasma display, light emitting diodes (LEDs), or any other type of display suitable for use in the wagering game machine 100. Alternatively, the primary display 114 can include a number of mechanical reels to display the outcome. In FIG. 1, the wagering game machine 100 is an "upright" version in which the primary display 114 is oriented vertically relative to the player. Alternatively, the wagering game machine can be a "slant-top" version in which the primary display 114 is slanted at about a thirty-degree angle toward the player of the wagering game machine 100. In yet another embodiment, the wagering game machine 100 can exhibit any suitable form factor, such as a free standing model, bartop model, mobile handheld model, or workstation console model.

In some embodiments, a transmissive LCD (Liquid Crystal Display) overlays mechanical reels. The transmissive LCD may provide graphics such as paylines, or animations that overlay the mechanical reel while allowing some or all of the reel to be viewed underneath the graphics. Further details regarding the incorporation of a transmissive LCD in a wagering game machine may be found in U.S. Pat. No. 6,517,433 entitled "Reel Spinning Slot Machine With Superimposed Video Image" which is hereby incorporated by reference for all purposes.

A player begins playing a basic wagering game by making a wager via the value input device 118. The player can initiate play by using the player input device's buttons or touch screen 128. The basic game can include arranging a plurality of symbols along a payline 132, which indicates one or more outcomes of the basic game. Such outcomes can be randomly selected in response to player input. At least one of the outcomes, which can include any variation or combination of symbols, can trigger a bonus game.

In some embodiments, the wagering game machine 100 can also include an information reader 152, which can include a card reader, ticket reader, bar code scanner, RFID transceiver, or computer readable storage medium interface. In some embodiments, the information reader 152 can be used to award complimentary services, restore game assets, track player habits, etc.

Wagering game machine 100, may have various doors and panels that may be removed to allow access to various areas of the wagering game machine. For example, doors on cabinet 112 may exist to allow access to a lower area 160, or top box area 162. Further doors may exist at the rear of wagering game machine 100. Additionally, doors or panels may exist for internal components of wagering game machine 100 and for peripheral assemblies (e.g., chairs, signs etc.) that are coupled with cabinet 112.

Figure 2:
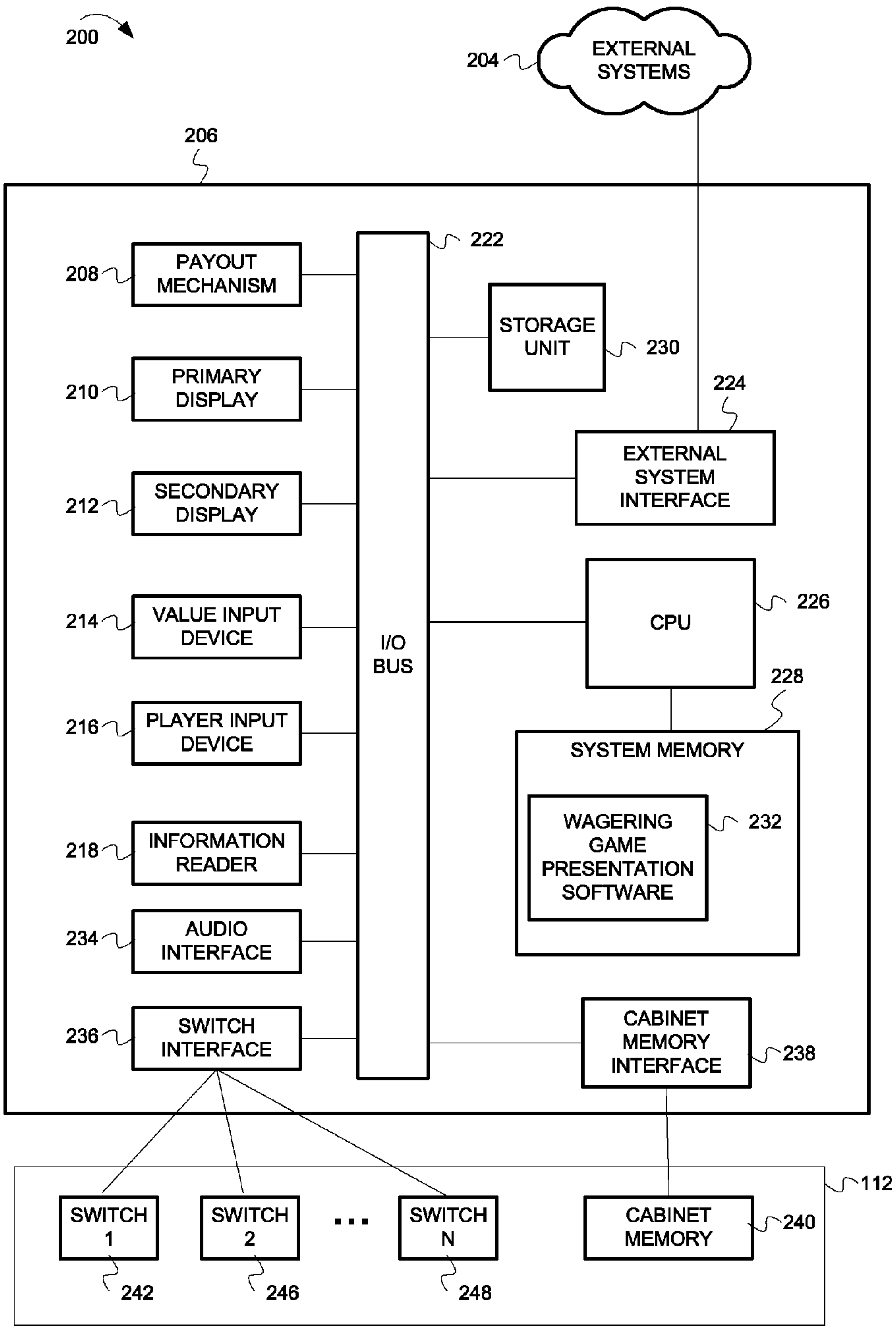
FIG. 2 is a block diagram illustrating a wagering game machine architecture, including a control system, according to example embodiments of the invention.

FIG. 2 is a block diagram illustrating an example wagering game machine architecture 206, including a control system, according to example embodiments of the invention. As shown in FIG. 2, the wagering game machine 206 includes a processor 226 connected to system memory 228, which includes wagering game presentation software 232. In one embodiment, the wagering game presentation software 232 can present wagering games, such as video poker, video black jack, video slots, video lottery, etc., in whole or part. In this example configuration, processor 226 is also connected to an input/output (I/O) bus 222, which facilitates communication between the wagering game machine's additional components. It should be clearly understood that many wagering game machines will not include all of the described components; and that components need not be connected through a single bus, or through a bus at all. In this illustrative example, I/O bus 222 is connected to a payout mechanism 208, primary display 210, secondary display 212, value input device 214, player input device 216, information reader 218, storage unit 230, switch interface 236 and cabinet memory interface 238. The player input device 216 can include the value input device 214 to the extent the player input device 216 is used to place wagers. The I/O bus 222 is also connected to an external system interface 224, which is connected to external systems 204 (e.g., wagering game networks).

When present, the value input device 214 can include, for example, a reader configured to receive credit from a stored-value card (e.g., casino card, smart card, debit card, credit card, etc.) inserted by a player. The value input device 214 can also comprise a sensor (e.g., an RF sensor) configured to sense a signal (e.g., an RF signal) output by a transmitter (e.g., an RF transmitter) carried by a player. The value input device 214 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 206. Still other value input devices 214 can require the use of touch keys on the touch screen. Upon entry of player identification information and, preferably, secondary authorization information (e.g., a password, PIN number, stored value card number, predefined key sequences, etc.), the player can be permitted to access a player's account. As one potential optional security feature, the wagering game machine 206 can be configured to permit a player to only access an account the player has specifically set up for the wagering game machine 206. Other conventional security features can also be utilized to, for example, prevent unauthorized access to a player's account, to minimize an impact of any unauthorized access to a player's account, or to prevent unauthorized access to any personal information or funds temporarily stored on the wagering game machine 206.

The player input device 216 can include the value input device 214 to the extent the player input device 216 is used to place wagers. Where inputs and/or wagers are received through the touch screen, as described herein, in many example systems, there may be no need for a separate player input device. In some examples, the wagering game machine 206 will include a player information reader 218 that facilitates identification of a player by reading a card with information indicating the player's identity (e.g., reading a player's credit card, player ID card, smart card, etc.). Such player information reader 218 can alternatively, or also, include a bar code scanner, RFID transceiver or computer readable storage medium interface. In one embodiment, the player information reader 218 comprises a biometric sensing device.

Switch interface 236 provides an interface between the system and one or more switches 242-248. Switches 242-248 may be switches that detect whether doors are open or closed, or whether panels are present or have been removed. Further, switches 242-248 may detect whether certain internal components are present or absent. Although three switches have been shown, those of skill in the art will appreciate that a system may have more or fewer switches.

Cabinet memory interface 238 provides an interface between the system and cabinet memory 240. Various wired and wireless interfaces may be used for interface 238. For example, the interface can be a serial bus such as I2C, SPI, or One-wire. Alternatively, interface 238 can be a wireless interface such as an RFID, Bluetooth or other wireless based interface.

Cabinet memory 240 is mounted within cabinet 112, either on the cabinet, on a cabinet component mounted on cabinet 112, or on a housing for a cabinet component designed to mount the cabinet component to cabinet 112. A cabinet component includes devices such as switches, harnesses, cable assemblies, connectors, top box assemblies, video displays, audio output devices (amplifiers, speakers etc.) reel assemblies, compartments, and doors. Cabinet memory 240 may be any type of non-volatile memory. Further, cabinet memory 240 is separate and distinct from system memory 228 or other memory that may be on a processor or logic board for the wagering game machine, and is separate from flash memory that may store the executable code for a wagering game presented on a wagering game machine. In some embodiments, the cabinet memory is configured as read-only with respect to processor 226. Further details on the placement and content of cabinet memory 240 are provided below.

In one embodiment, the wagering game machine 206 can include additional peripheral devices and/or more than one of each component shown in FIG. 2. For example, in one embodiment, the wagering game machine 206 can include one or more external system interfaces 224, multiple processors 226 and multiple switch interfaces 236. In one embodiment, any of the components can be integrated or subdivided. Additionally, in one embodiment, the components of the wagering game machine 206 can be interconnected according to any suitable interconnection architecture (e.g., directly connected, hypercube, etc.).

In one embodiment, any of the components of the wagering game machine 206 can include hardware, firmware, and/or software for performing the operations described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 3:
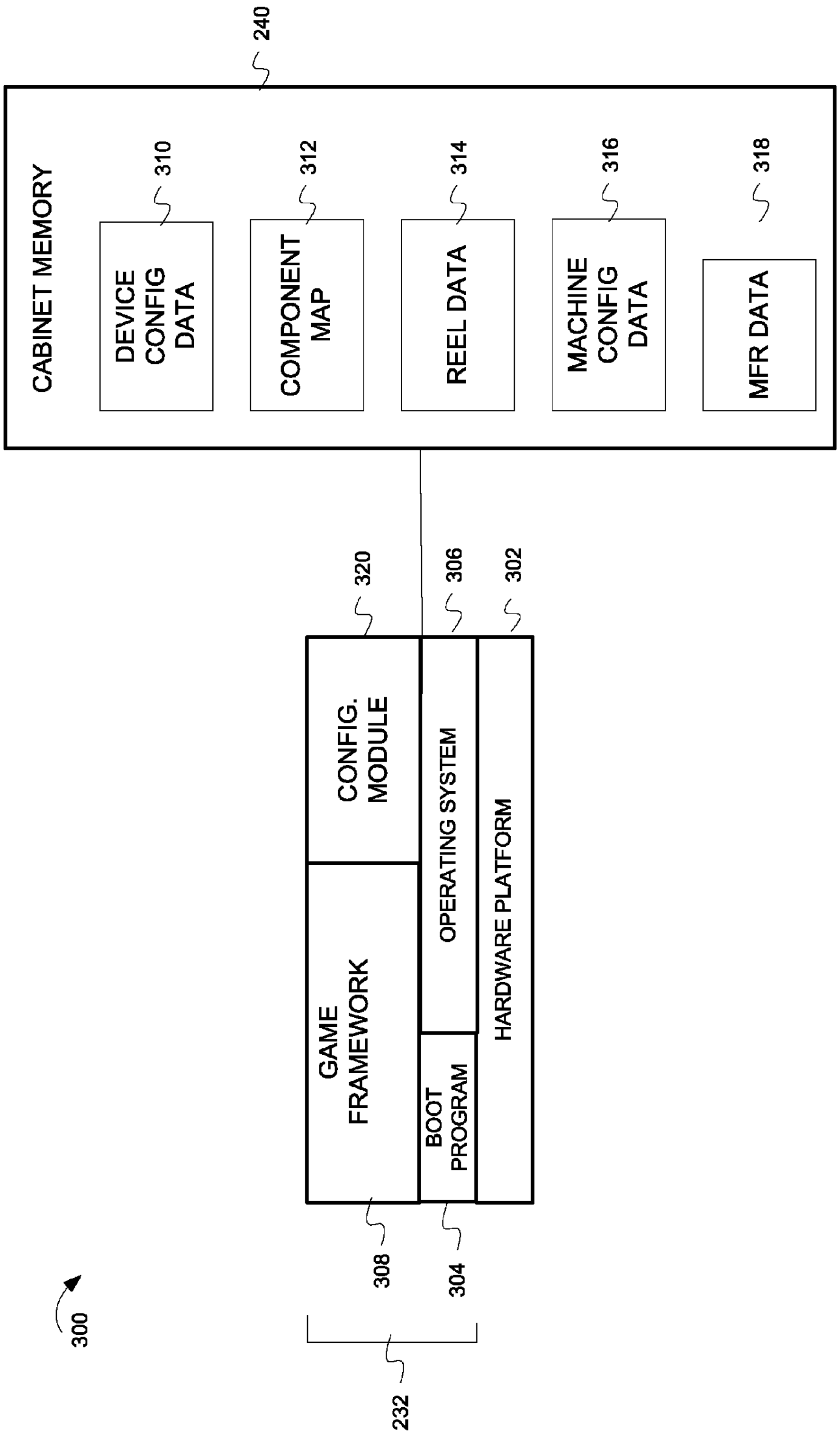
FIG. 3 is a block diagram illustrating various modules of an architecture for a wagering game system.

FIG. 3 is a block diagram illustrating various modules of an architecture for a wagering game system 300, according to example embodiments of the inventive subject matter. As shown in FIG. 3, the wagering game architecture 300 includes wagering game machine software 232 that utilizes various data components of cabinet memory 240.

Wagering game software 232, in some embodiments, includes a boot program 304, an operating system 306, a game framework 308 that presents a wagering game, and a configuration module 320. In various embodiments, the hardware platform executing wagering game software 232 may include a thin-client, thick-client, or some intermediate derivation. The hardware platform may also be configured to provide a virtual client. The boot program 304 may include a basic input/output system (BIOS) or other initialization program that works in conjunction with the operation system 306 to provide a software interface to the hardware platform. The game framework 308 may include standardized game software components either independent or in combination with specialized or customized game software components that are designed for a particular wagering game. The customized components may implement a theme for the wagering game. Further, the components may include audio, video, and image data that are used to present theme elements for the wagering game. In one example embodiment, the wagering game framework 308 may include software operative in connection with the hardware platform and operating system 306 to present wagering games, such as video poker, video black jack, video slots, video lottery, etc., in whole or part. Further, the game framework 308 may include software operative to accept a wager from a player. According to another example embodiment, one or more of the components of game framework 308 may be provided as part of the operating system 306 or other software used in the wagering game system 300 (e.g., libraries, daemons, common services, etc.).

Configuration module 320 comprises software that reads various data components from cabinet memory 240. The data components include configuration parameters for one or more cabinet components. Configuration module 320 uses the configuration parameters in the data components to provide or derive configuration parameters for various components and to configure operational aspects of wagering game machine 100. Further details on the operation of configuration module 320 are provided below with reference to FIGS. 8-10.

Various data components may be stored on cabinet memory 240. While various components are illustrated in FIG. 3, it should be noted that various embodiments may include various combinations of one or more of the components illustrated in FIG. 3.

Device configuration data 310 comprises data that is used to configure a device or type of device in the wagering game machine. In some embodiments, device configuration data 310 may comprise audio settings for an audio amplifier. As an example, a wagering game machine may be capable of using multiple different types of audio amplifiers, each with different configuration parameters. Device configuration data 310 may include equalization settings for various audio channels associated with the audio amplifier, default volume settings and other configuration data used to configure the type of audio amplifier installed in the wagering game machine.

Device configuration data 310 may be present for multiple devices. For example, lighting devices, ticket printers, bill readers or other devices on the wagering game machine.

Component map 312 provides data used to map physical components of a wagering game machine to labels that may be used to identify the components. For example, some cabinets may have various switches where switch 1 determines whether a main door is open, while on other cabinets, switch 2 determines whether a rear door is open and other switches are associated with other doors. In other cabinets, the switches may be configured differently. For example, switch 2 may be assigned to the main door while switch 1 monitors the rear door. In previous wagering game machines, it was necessary that the software monitoring the door status be specifically developed for a particular cabinet configuration. Component map 312 provides a mapping such that the software need only refer to the component's label, which is then used to identify the proper physical component. The use of a label provides a means for the same label to be used across different cabinet types to refer to a component that provides a particular function, regardless of the configuration of physical components that may be used in a particular cabinet.

An example of a component map 312 is provided in FIG. 4. In the example shown, component map 312 includes data indicating a physical switch number 402, and data providing a corresponding label 404 for the physical switch number. Other data may be included in the switch map, for example, text strings describing the function of the switch may be included in the switch map 312. Further, security levels may be defined for various switches in the switch map. For example, a first security level may be defined in which the machine is allowed to run in a demo or test mode, while a second security level may be defined in which the wagering game machine is not allowed to run at all. Desired security levels may then be assigned to the doors.

While the example component map provided in FIG. 4 is addressed to switches, those of skill in the art with the benefit of this disclosure will appreciate that other components may be mapped. For example, a cabinet may have multiple speakers, audio channels, tactile feedback devices etc. that may be mapped to labels.

Figure 5A:
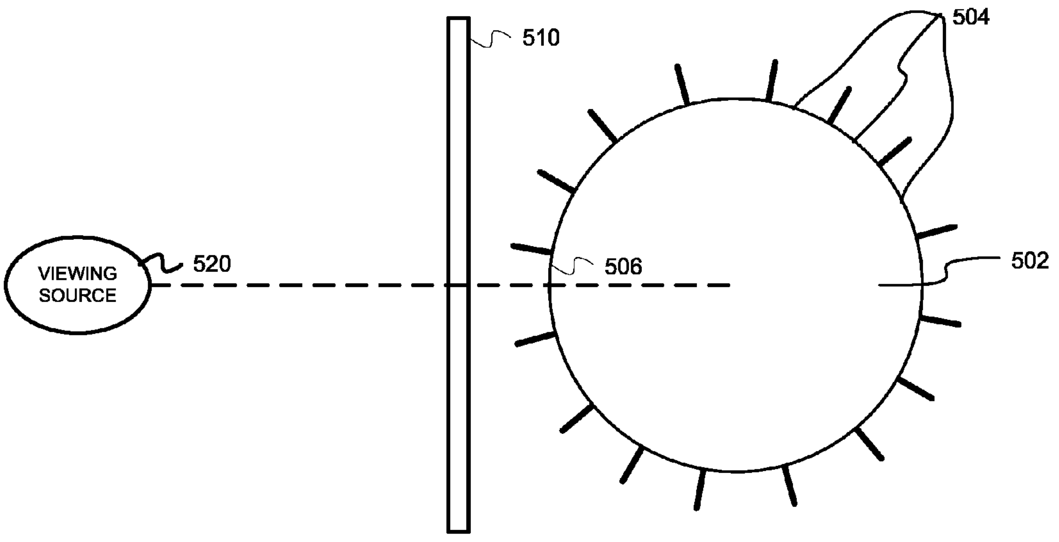
FIGS. 5A and 5B schematically depict facing angles configuring reels of a wagering game machine.
Figure 5B:
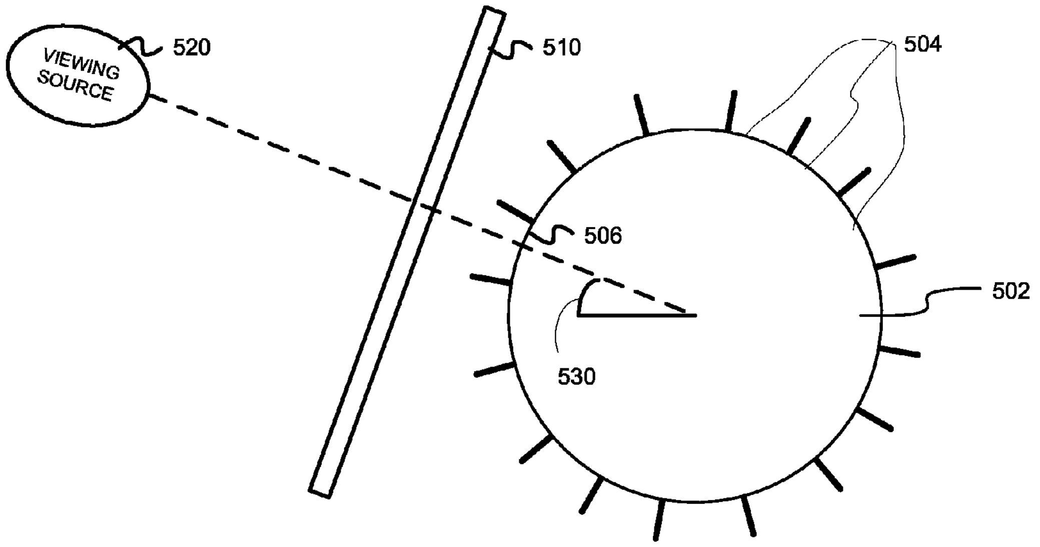

Returning to FIG. 3, reel data 314 comprises data related to the configuration of the reels of a wagering game machine. In some embodiments, reel data 314 provides data regarding a base position for the reels. The base position (also referred to as position 0) of the reels may vary depending on the angle of glass that overlays the reels. FIGS. 5A and 5B illustrate this concept. FIG. 5A illustrates a side view of a reel 502 having a plurality of potential stop positions 504. In FIG. 5A, a glass 510 overlaying reel 502 is roughly perpendicular to the ground. Thus a player has a viewing source 520 to base position 506 that is roughly 0 (zero) degrees from horizontal.

In FIG. 5B, a "slant top" style of wagering game machine is represented in which the glass 510 overlaying the reel has a facing angle 530 that is approximately thirty degrees from horizontal. The facing angle may then be used to set the appropriate base position (position 0).

Returning to FIG. 3, reel data 314 may include various data that is used to determine a desired base position. In some embodiments, the data may include a facing or angle (e.g., angle 530) that specifies an offset from a base position. In alternative embodiments, reel positions may be identified (e.g., numerically) and a desired base position may be configured by specifying the numeric identifier or numeric offset for the position that is to be used as the desired base position.

Machine configuration data 316 may include configuration data that specifies or describes components in the wagering game machine. For example, machine configuration data 316 may specify the cabinet type, the number of displays on the machine, display mode (portrait or landscape) whether a top box is present, the type of touchscreen present (if any), and other accessories or components that are permanent to the cabinet.

Manufacturing data 318 may include data such as when the machine was built, when the wagering game machine became operational, when the wagering game machine was tested, a serial number for the wagering game machine, the location of manufacture of the wagering game machine, patent numbers associated with the machine etc.

In some embodiments, some or all of the data components may be securely stored on cabinet memory 240 to ensure that only authorized processes or parties can access the data and to prevent tampering with the data. For example the data components may be signed and authenticated using methods known by those of skill in the art. Further, the data may be encrypted using methods known by those of skill in the art.

Figure 6A:
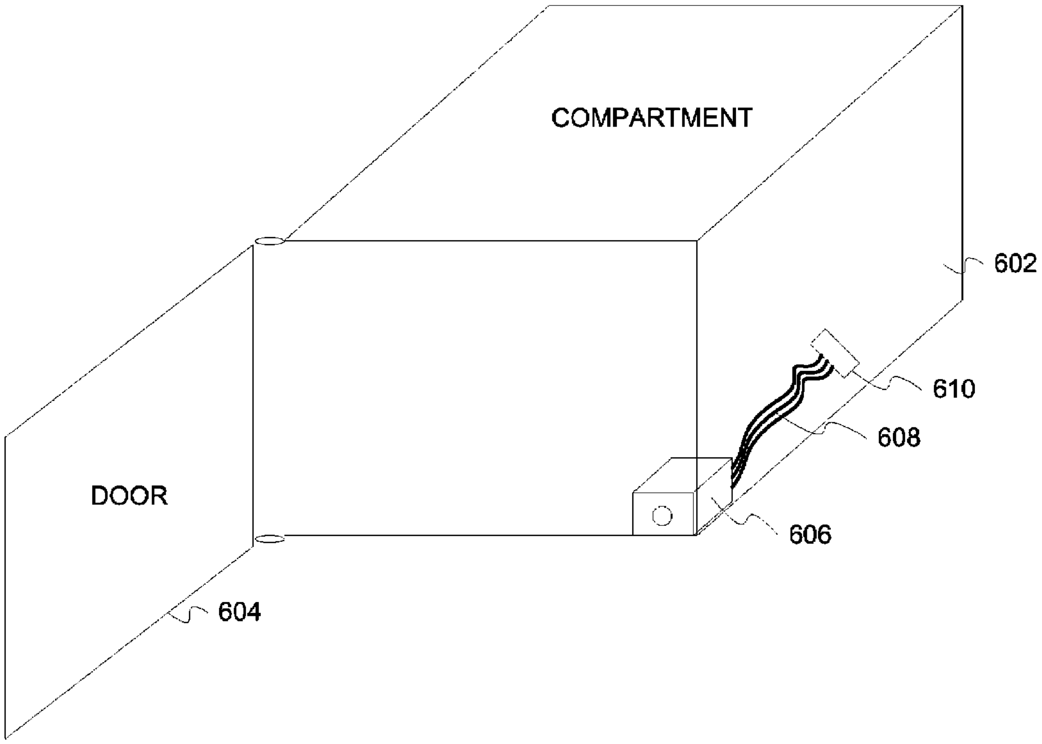
FIGS. 6A, 6B and 7 illustrate example locations for cabinet memory 240 according to embodiments of the invention.
Figure 6B:
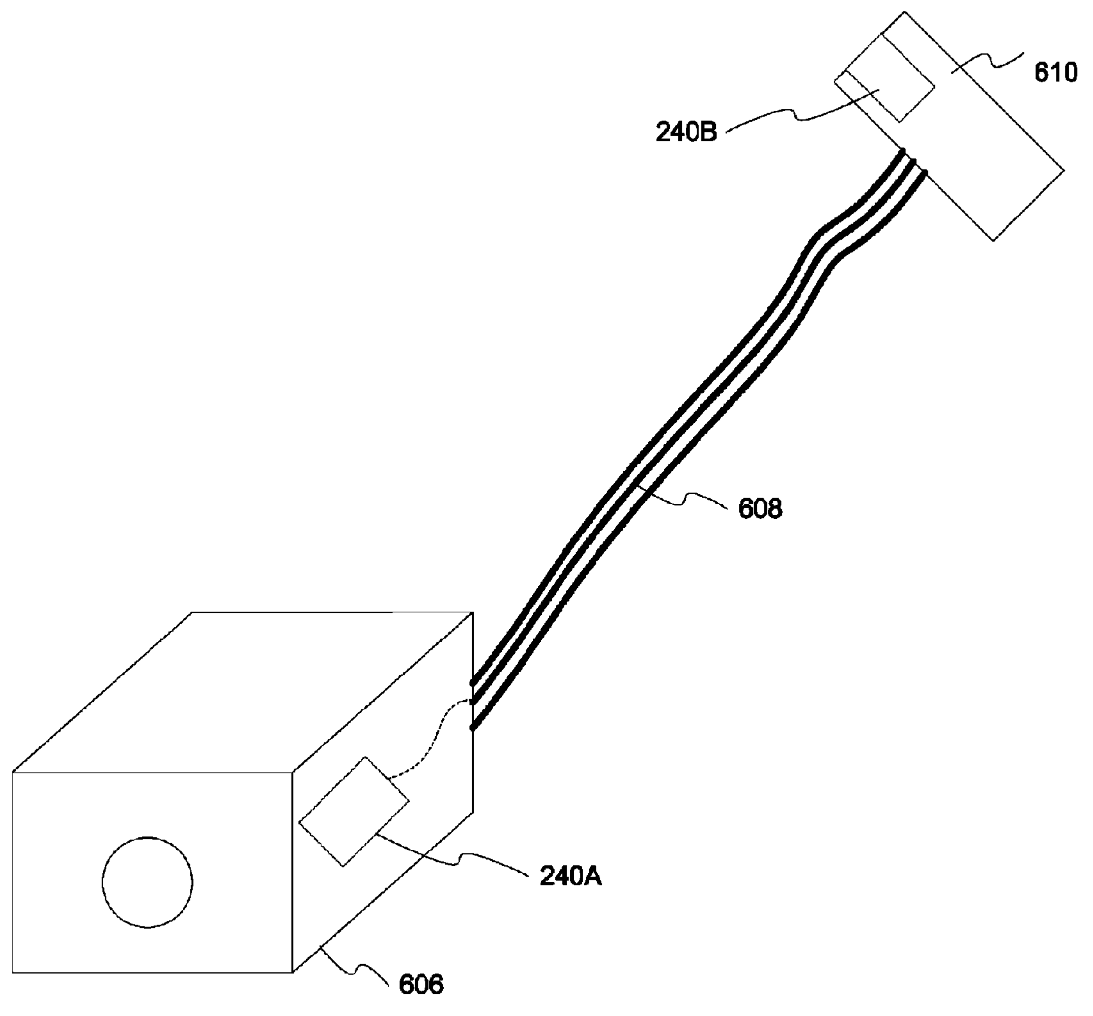

FIGS. 6A and 6B illustrate example locations for cabinet memory 240 according to embodiments of the invention. Cabinet memory 240 may be mounted in any location desired in a wagering game machine cabinet, desirably in a manner making removal of the cabinet memory difficult. Further, in some embodiments, cabinet memory is mounted in a concealed or secret location designed to make discovery of the cabinet memory difficult. In some embodiments, the concealed or secret location is within a component or housing of a component that is not associated with processing, memory, or logic operations. FIG. 6A illustrates an example compartment 602 that is part of a wagering game machine cabinet. In some embodiments, the compartment may be a logic compartment for receiving processor or other logic boards for the wagering game machine. Compartment 602 includes a door 604 and a door switch 606 designed to detect when door 604 is opened and closed. Door switch 606 may be coupled to one or more wires (or cables) 608, which in turn may be coupled to a cable interconnect 610. Cable interconnect 610 may be mated with other interconnects on a processor or logic board to couple the door switch to switch interface 236, which is coupled to a processor 226 on a logic or processor boards inserted into compartment 602.

FIG. 6B provides further details regarding door switch 606 and cable interconnect 610. In some embodiments, cabinet memory 240A is mounted within an enclosure or housing for door switch 606 such that it is concealed from view. In embodiments where a wired interface couples cabinet memory to the system, a wire may be placed among wires 608 such that the cabinet memory wire or wires appear to be part of the wires 608 associated with door switch 606. In alternative embodiments, cabinet memory 240B is concealed within the cable interconnect 610. In further alternative embodiments, cabinet memory 240 may be concealed in a cable harness assembly (not shown).

Figure 7:
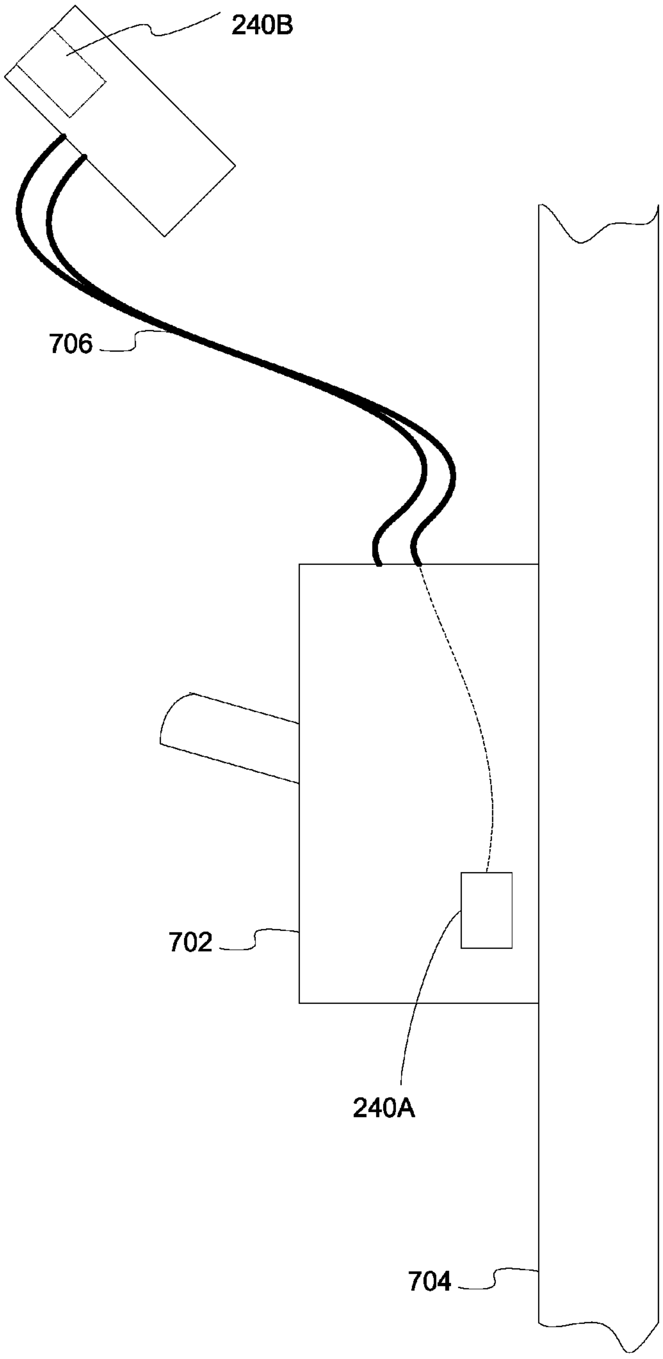

FIG. 7 illustrates a further alternative location for a cabinet memory. In some embodiments, a wagering game machine cabinet may include one or more switches 702. Although illustrated as a toggle switch in FIG. 7, switch 702 may be any type of switch. In the example illustrated in FIG. 7, switch 702 is mounted to a portion 704 of a wagering game machine cabinet. In some embodiments, cabinet memory 240A is mounted within the housing or enclosure for switch 702 such that it is concealed from view. Wires used to couple cabinet memory 240A to the system may be included with switch wires 706 such that the cabinet memory wires appear, from the outside, to be part of the switch wires.

Further details on the operation of the above systems and components are provided below with reference to FIGS. 8-10.

Example Operations

Figure 8A:
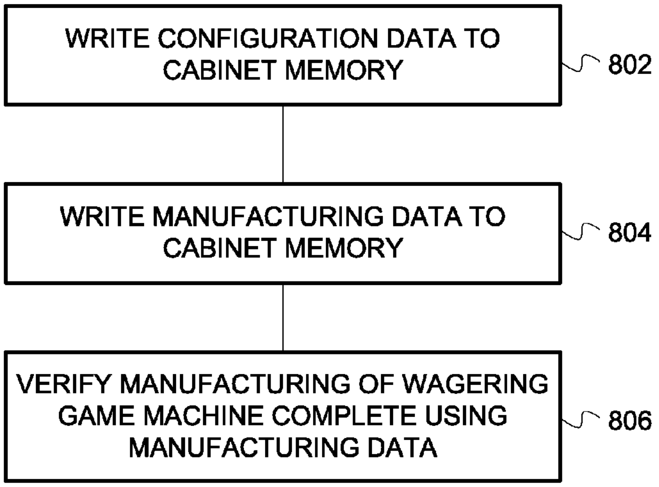
FIGS. 8-10 are flowcharts illustrating methods for configuring a wagering game machine with a cabinet memory mounted on or within the cabinet of a wagering game machine.
Figure 8B:
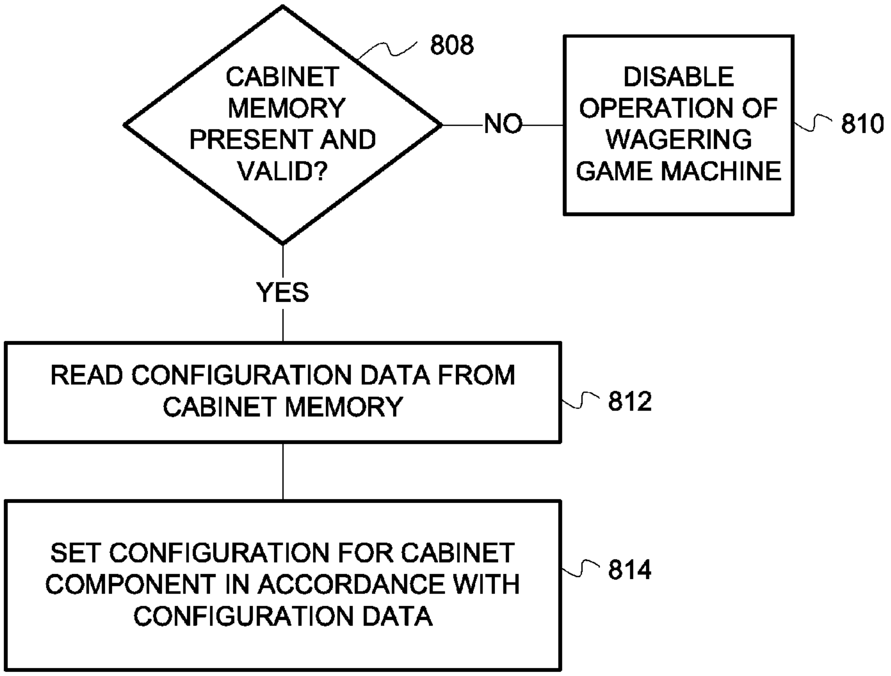
Figure 9:
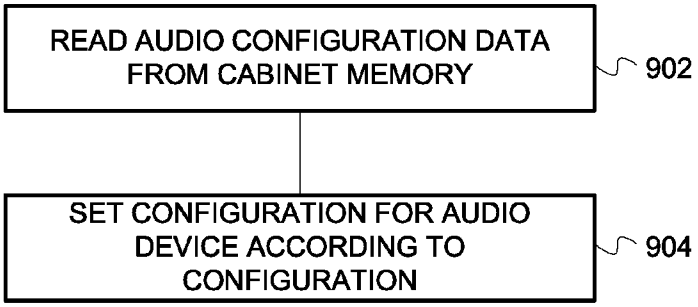
Figure 10:
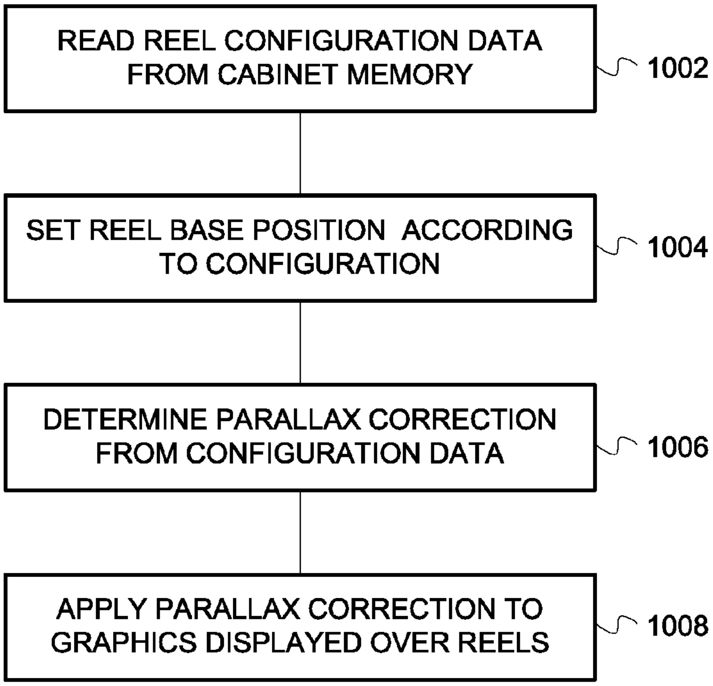

While FIGS. 1-7 describe example embodiments of a wagering game machine architecture, FIGS. 8-10 show methods of manufacturing and operating a wagering game machine according to embodiments of the invention.

FIG. 8A is a flowchart illustrating a method of using a cabinet memory during the manufacture of a wagering game machine according to embodiments of the invention. At block 802, configuration data is written to a cabinet memory. The configuration data may be written prior to the cabinet memory being mounted or affixed to a cabinet or cabinet component of the wagering game machine, or it may be written after the cabinet memory is mounted or affixed. The configuration data may include some, all or various combinations of the configuration data described above with reference to FIG. 3. For example, the configuration data may specify components that have been used in the manufacture of the wagering game machine and configuration settings for the components.

At block 804, manufacturing data is written to the cabinet memory. As discussed above, such manufacturing data may include dates for steps or stages in the manufacturing process. Such dates include the date the wagering game machine was built, the date the wagering game machine became operational, and the date or dates that one or more tests were run on the wagering game machine. The manufacturing data may also include a serial number of the wagering game machine stored on the cabinet memory. The serial number can be used to track various aspects of the wagering game machine after it is deployed in a gaming establishment. For example, back end servers can receive the serial number and use it to associate the wagering game machine with other data received from the wagering game machine.

At block 806, the manufacturing data may be read to determine if the manufacture of the wagering game machine is complete. For example, a system executing the method may determine that the manufacture of the wagering game is not complete if certain steps or stages in the manufacturing process identified in the configuration data do not have a completion date associated with the step. Otherwise, if a date is associated with each of the stages or steps identified in the manufacturing configuration data, a system executing the method may determine that the manufacture of the wagering game machine is complete.

In some embodiments, some or all of the data written to the cabinet memory at blocks 802 and 804 are digitally signed and authenticated. Methods for signing and authenticating such as SHA or MD5 may be used. Further, the data may be encrypted.

FIG. 8B is a flowchart illustrating a method of using a cabinet memory during the operation of a wagering game machine, according to embodiments of the invention. The method begins at block 808, with the wagering game machine determining if the cabinet memory is present and valid. In some embodiments, the cabinet memory may be determined to be not present if it is missing or not coupled to a processor through a cabinet memory interface. The cabinet memory may be present, but not valid, if the wagering game machine cannot successfully authenticate the cabinet memory using the methods and keys originally used to digitally sign the data stored on the cabinet memory.

Upon determining that the cabinet memory is missing or invalid, at block 810 operation of the wagering game machine is disabled in some embodiments. Various modes of disablement may be used in varying embodiments. For example, the wagering game machine may be placed in a "tilt" state. Wagering on the wagering game machine may be disabled, but the wagering game machine may be allowed to operate diagnostics or configuration programs. Alternatively, all operation of the wagering game machine may be disabled until a valid cabinet memory is present.

Otherwise, if the cabinet memory is present and valid, then at block 812 one or more processors of the wagering game machine read the configuration data. For example, a configuration module of the wagering game machine may read the configuration data.

At block 814, the configuration module applies the configuration data by setting configuration parameters for one or more devices or cabinet components present on the wagering game machine.

FIG. 9 is a flowchart providing further details of a method for configuring a wagering game system including an audio device according to embodiments of the invention. The method begins at block 902 with reading audio configuration data from a cabinet memory by one or more processors of a wagering game machine. As discussed above, the audio configuration data may be volume data or equalization settings for one or more channels supported by an audio device that is part of the wagering game machine cabinet.

At block 904, the processors set various configuration parameters in accordance with the configuration data read at block 902. In some embodiments, the parameters may be sent to an audio device such as an audio amplifier using S/PDIF. Further, configuration settings may be applied to an audio controller that sends data to the audio amplifier based on the data read at block 902.

FIG. 10 is a flowchart providing further details of a method for configuring a wagering game system including mechanical reels according to embodiments of the invention. The method begins at block 1002 with reading reel configuration data from a cabinet memory by one or more processors of a wagering game machine. As discussed above, the reel configuration data may include a facing angle for the reels.

At block 1004, the system sets a base position for the reels using the facing angle data read at block 1002. In some embodiments, the operating system determines what the base position should be using the facing angle. When a wagering game application communicates a reel position to the operating system, the operating system adjusts the reel position according to the base position as adjusted by the facing angle. In alternative embodiments, the wagering game application may receive the reel configuration data and determine a reel position based on the facing angle prior to communicating the reel position to the operating system. In these embodiments, the operating system does not need to adjust the reel position because the wagering game application has done so.

As noted above, in some embodiments, the wagering game machine may include a transmissive LCD positioned in front of or over the reels. The distance between the viewer (i.e., the user of the wagering game machine) and the transmissive LCD and the distance between the transmissive LCD and the reel surface may result in parallax if the facing angle is not substantially close to zero degrees from horizontal. At block 1006, the system determines a parallax correction parameter based on the reel configuration data read at block 1002. Such data may include the facing angle, and may further include data specifying the distance from the reel to the transmissive LCD.

At block 1008, the system applies the parallax correction parameter to the position of graphics that are to be displayed on the transmissive LCD. In some embodiments, the operating system may apply the parallax correction parameter after receiving graphics from the wagering game application. In alternative embodiments, the wagering game application applies the parallax correction parameter prior to sending graphics to the operating system.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A gaming machine operable to configure resident hardware components by implementing hardware configuration data stored in the gaming machine, the gaming machine comprising:

a cabinet;

one or more hardware components including a transmissive LCD display device;

one or more processors;

one or more system memory devices storing executable instructions; and a cabinet memory device mounted on the cabinet or mounted on a first cabinet component mounted to the cabinet, the cabinet memory device coupled to at least one of the one or more processors via a cabinet memory interface, the cabinet memory device storing hardware configuration data for the one or more hardware components, the hardware configuration data including a facing angle for the transmissive LCD display device;

wherein the stored executable instructions, when executed by at least one of the one or more processors, cause the gaming machine to:

read the hardware configuration data from the cabinet memory device;

configure at least one of the one or more hardware components according to the hardware configuration data read from the cabinet memory device, wherein configuring the one or more hardware components includes determining a parallax correction based on the facing angle; and display graphics, via the transmissive LCD display device, in accordance with the parallax correction.

2. The gaming machine of claim 1, wherein the one or more hardware components further include an audio amplifier, and the hardware configuration data further includes equalization settings for the audio amplifier.

3. The gaming of claim 1, wherein the cabinet memory interface includes an interface selected from the group consisting of I2C, SPI, or One-wire.

4. The gaming machine of claim 1, wherein the cabinet memory device is concealed within a housing of another component mounted on the cabinet or to a component of the cabinet.

5. The gaming machine of claim 4, wherein the another component comprises a switch.

6. The gaming machine of claim 1, wherein the cabinet memory device is only individually removable from the cabinet.

7. A method of operating a wagering game machine, the method comprising the acts of:

reading, by at least one of one or more processors, configuration data from a cabinet memory mounted on a wagering game machine cabinet or mounted on first cabinet component of a wagering game machine, the configuration data including a facing angle for a transmissive LCD display device of the wagering game machine;

determining, via at least one of the one or more processors, a parallax correction based on the facing angle; and dividing graphics on the transmissive LCD display device in accordance with the parallax correction.

8. The method of claim 7, wherein the configuration data further comprises equalization settings for an audio device of the wagering game machine.

9. The method of claim 8, further comprising sending the equalization settings to the audio device.

10. The method of claim 7, wherein the configuration data further comprises a facing angle for a plurality of reels; and wherein the method further comprises setting a base position for the plurality of reels in accordance with the facing angle.

11. The method of claim 7, wherein the configuration data further comprises data mapping one or more switches to one or more labels identifying a name or location of the one or more switches.

12. The method of claim 7, further comprising:

in response to determining that the cabinet memory is not present or is not valid, disabling operation of at least one mode of the wagering game machine.

13. A computer-implemented method of configuring hardware components in a gaming machine according to hardware configuration data stored separately from system and application programs, the method comprising:

storing, via at least one of one or more processors, hardware configuration data for one or more hardware components of the gaming machine in a cabinet memory device mounted to the cabinet, the hardware configuration data including a facing angle for a transmissive LCD display device;

reading the hardware configuration data from the cabinet memory device;

(ii) configuring the one or more hardware components according to the configuration data read from the cabinet memory device, wherein configuring the one or more hardware components includes determining a parallax correction based on the facing angle; and executing, via at least one or the one or more processors, a wagering game application to conduct a wagering game for a player, wherein executing the wagering game application includes displaying graphics on the transmissive LCD display device in accordance with the parallax correction.

14. The method of claim 13, wherein the cabinet memory device is separate and distinct from other memory that resides on a processor or is mounted on a logic board along with a processor.

15. The method of claim 13, wherein the cabinet memory device is only individually removable from the cabinet.

16. The method of claim 13, wherein the cabinet memory device is configured as read-only memory with respect to the one or more processors.

17. A machine-readable, non-transitory medium storing executable instructions for configuring one or more hardware components in a gaming machine, the gaming machine further including a transmissive LCD display device, a cabinet, and a cabinet memory device fixed to the cabinet, the cabinet memory device storing hardware configuration data including a facing angle for the transmissive LCD display device, the instructions, when executed by at least one of one or more processors, causing the gaming machine to:

read the hardware configuration data from the cabinet memory device;

configure at least one of the one or more hardware devices according to the hardware configuration data read from the cabinet memory device, wherein configuring the one or more hardware components includes determining a parallax correction based on the facing angle; and execute, a wagering game application to conduct a wagering game for a player, wherein executing the wagering game application includes displaying graphics on the transmissive LCD display device in accordance with the parallax correction.

18. The machine-readable medium of claim 17, wherein the one or more hardware components further include an audio device and the hardware configuration data includes equalization settings for the audio device.

19. The machine-readable medium of claim 18, wherein the instructions further cause the gaming machine to send the equalization settings to the audio device.

20. The machine-readable medium of claim 17, wherein the one or more hardware components includes a plurality of reels and the hardware configuration data includes another facing angle for the plurality of reels; and wherein the instructions further cause the gaming machine to set a base position for the plurality of reels in accordance with the another facing angle.

21. The machine-readable medium of claim 17, wherein the hardware configuration data further includes data mapping one or more switches to one or more labels identifying a name or location of the one or more switches.

22. The machine-readable medium of claim 17, wherein the instructions further cause the gaming machine to, in response the cabinet memory device being either not present or not valid, disable at least one function of the wagering game machine.

* * * * *